US009551496B2

(12) United States Patent
McCarty

(10) Patent No.: US 9,551,496 B2
(45) Date of Patent: Jan. 24, 2017

(54) DISPLACEMENT-INDUCTION NEUTRAL WALL AIR TERMINAL UNIT

(75) Inventor: Daniel P. McCarty, Edina, MN (US)

(73) Assignee: Dan P. McCarty, Edina, MN (US)

( * ) Notice: Subject to any disclaimer, the term of this patent is extended or adjusted under 35 U.S.C. 154(b) by 1680 days.

(21) Appl. No.: 13/090,988

(22) Filed: Apr. 20, 2011

(65) Prior Publication Data

US 2012/0270494 A1  Oct. 25, 2012

(51) Int. Cl.
| | |
|---|---|
| *F24F 7/00* | (2006.01) |
| *F24F 1/00* | (2011.01) |
| *F24F 1/01* | (2011.01) |
| *F24D 1/00* | (2006.01) |
| *F24D 3/02* | (2006.01) |
| *F24D 19/00* | (2006.01) |
| *F24D 19/10* | (2006.01) |

(52) U.S. Cl.
CPC .............. *F24F 1/0007* (2013.01); *F24D 1/00* (2013.01); *F24D 3/02* (2013.01); *F24D 19/0087* (2013.01); *F24D 19/1003* (2013.01); *F24D 19/1009* (2013.01); *F24F 1/0033* (2013.01); *F24F 1/01* (2013.01); *F24F 2001/004* (2013.01); *F24F 2221/34* (2013.01); *F24F 2221/54* (2013.01)

(58) Field of Classification Search
CPC .......... F24F 1/01; F24F 1/0007; F24F 1/0033; F24F 2001/004; F24F 2221/34; F24F 2221/54; F24D 19/0087; F24D 19/1003; F24D 19/1009; F24D 1/00; F24D 3/02
USPC ...................... 454/237, 241, 41; 62/427, 428
See application file for complete search history.

(56) References Cited

U.S. PATENT DOCUMENTS

| | | | | | |
|---|---|---|---|---|---|
| 2,331,691 | A | * | 10/1943 | Hubbard | F24F 1/0007 165/124 |
| 2,894,375 | A | * | 7/1959 | Waterfill | F24F 3/0522 62/196.4 |
| 3,172,463 | A | * | 3/1965 | Bowman | F24F 1/01 165/123 |
| 3,623,542 | A | * | 11/1971 | Fragnito | B60H 1/00485 165/123 |

(Continued)

OTHER PUBLICATIONS

TROX QLCI Displacement Chilled Beams with Convective Heating Elements, 1 page (at least as early as Dec. 4, 2012).

(Continued)

*Primary Examiner* — Avinash Savani
*Assistant Examiner* — Vivek Shirsat
(74) *Attorney, Agent, or Firm* — Merchant & Gould P.C.

(57) ABSTRACT

An induction-displacement neutral wall air terminal unit includes a housing defining a supply airflow path, a connected return airflow path, and a heating airflow path separated from the supply and return airflow paths by at least one interior wall. The unit also includes a plurality of induction-type nozzles located within the supply airflow path, that are deliver a ventilation air flow stream into the supply air flow path. The nozzles induce a return air flow stream through the return air flow path that mixes with the ventilation air flow stream to form a supply air flow stream delivered to a supply air outlet. A heating element is disposed within the heating airflow path to heat air within the heating air flow path. A plurality of fans may be placed within the heating airflow path to increase the overall heating capacity of the unit.

14 Claims, 7 Drawing Sheets

(56) References Cited

U.S. PATENT DOCUMENTS

| | | | | |
|---|---|---|---|---|
| 3,877,513 | A * | 4/1975 | Arledge, Jr. | F24F 11/027 165/123 |
| 4,100,964 | A * | 7/1978 | Gorchev et al. | 165/217 |
| 4,508,022 | A * | 4/1985 | Finkelstein | F24F 1/01 454/299 |
| 4,526,227 | A * | 7/1985 | Baker | F24F 1/0007 165/124 |
| 4,657,178 | A * | 4/1987 | Meckler | 236/13 |
| 5,005,636 | A * | 4/1991 | Haessig | 165/214 |
| 5,014,609 | A * | 5/1991 | Weck | 454/237 |
| 6,099,406 | A * | 8/2000 | Demster | 454/236 |
| 6,250,373 | B1 * | 6/2001 | Vecchi | F24F 1/0007 165/125 |
| 7,013,969 | B1 † | 3/2006 | Loudermilk | |
| 7,191,615 | B2 * | 3/2007 | Lee | F24F 1/0007 454/296 |
| 7,334,424 | B2 * | 2/2008 | Park | F24F 1/0007 454/187 |
| 7,740,530 | B2 * | 6/2010 | Astourian | F24F 13/082 219/201 |
| 8,469,783 | B2 * | 6/2013 | Juslin et al. | 454/237 |
| 2006/0035579 | A1 * | 2/2006 | Choi et al. | 454/237 |
| 2008/0098750 | A1 * | 5/2008 | Busier | F24H 4/04 62/3.3 |
| 2009/0241576 | A1 * | 10/2009 | Tsuji et al. | 62/259.1 |
| 2009/0264062 | A1 * | 10/2009 | Miller et al. | 454/237 |
| 2010/0140363 | A1 * | 6/2010 | Hirsch et al. | 236/12.1 |
| 2010/0206541 | A1 * | 8/2010 | Webster | 165/247 |
| 2011/0174475 | A1 * | 7/2011 | Tangney | 165/253 |
| 2011/0253350 | A1 * | 10/2011 | Belles | F24D 19/0087 165/120 |
| 2012/0015600 | A1 * | 1/2012 | Larsson | F24F 13/26 454/254 |

OTHER PUBLICATIONS

"QLCI Displacement with Induction for Classroom HVAC Applications", Product Catalog, Trox USA, Inc. (undated), 49 pages.

Author: Not Available; Title: "E.H. Price Limited Product Catalog." 3 pages total, including: cover page, back page, product page (J-89); Pub. Date: at least 2007; Publisher: Not Available; Place of publication: Not Available.†

* cited by examiner
† cited by third party

DISPLACEMENT-INDUCTION NEUTRAL WALL AIR TERMINAL UNIT

TECHNICAL FIELD

This disclosure relates to heating, ventilation, and air-conditioning (HVAC) systems, and particularly to air terminal units configured to simultaneously provide heating and displacement ventilation to a space.

BACKGROUND

Displacement ventilation systems are in wide spread use in the HVAC industry. One particular application for such systems is in school buildings. Typically, a number of displacement air terminal devices will be located along a perimeter wall of a classroom space and are configured to deliver ventilation air to the space. The ventilation air is generally several degrees below the space set point temperature to ensure that the ventilation air effectively pools across the floor of the space. Due to the heat generated by the occupants and equipment in the space, the ventilation air is naturally drawn up by convection which ensures fresh air is continually delivered to the breathing zone of the occupants. The heated air continues to rise to the ceiling level where it can be removed from the space. Thus, those skilled in the art readily recognize the advantages of displacement ventilation air systems to both cool and ventilate a space in a highly efficient manner.

It is also known to configure displacement air terminal devices to have induction nozzles such that room air from the space can be conditioned, filtered, and returned to the space in a mixture with the ventilation air. This type of unit is sometimes referred to as an induction-displacement unit. One such unit is sold as the "Trox QLCI Displacement Terminal" and is available from Trox USA, Inc. of Alpharetta, Ga. A similar unit and system are described in U.S. Pat. No. 7,013,969 to Loudermilk, the entirety of which is hereby incorporated by reference herein. In this type of system, a coil is provided in the return air path of the induction-displacement unit to condition the return air, as necessary. In the cooling mode, the coil will reduce the return air temperature to a few degrees below the space temperature to match the temperature of the ventilation air. In the heating mode, the coil may be set to raise the temperature of the return air such that the delivered air has a higher temperature than that of the air in the room. In this mode a minimum space temperature set point can be maintained. However, in doing so, the induction-displacement unit can no longer function as a displacement terminal unit due to the fact that the delivered air starts rising as soon as it leaves the unit instead of pooling across the floor. To prevent the necessity of having to place an induction-displacement unit in the heating mode, a separate heating system can be provided in the space, such as fin-tube radiation or radiant panels. However, as the induction-displacement units are placed along at least one wall of the space, such heating systems cannot be placed in the same location. This is especially troublesome where the induction-displacement units are located along an exterior wall of the space because this is the location where heating is generally most needed. As such, improvements are desired for induction-displacement units that can simultaneously provide heating to an exterior wall of a space and provide displacement ventilation air to the space.

SUMMARY

An induction-displacement neutral wall air terminal unit is disclosed. The disclosed unit has a housing defining a supply airflow path extending between a ventilation air inlet and a supply air outlet, a return airflow path extending between a return air inlet and the supply airflow path, and a neutral wall heating airflow path extending between an inlet and an outlet. The heating airflow path is separated from the supply and return airflow paths by at least one interior wall. The unit also includes a plurality of induction-type nozzles located within the supply airflow path. The induction-type nozzles are constructed and arranged to deliver a ventilation air flow stream into the supply air flow path and to induce a return air flow stream through the return air flow path that mixes with the ventilation air flow stream to form a supply air flow stream. Additionally, a heating element is disposed and heats air within the neutral wall heating airflow path. Optionally, a plurality of fans can be placed within the neutral wall heating airflow path to increase the overall heating capacity of the unit. The unit can be configured to deliver a supply airflow stream having a temperature of about 50° F. to about 70° F. and a heating airflow stream having a temperature of about 80° F. to about 120° F. Stated another way, the unit can be configured to simultaneously deliver a supply airflow stream having a temperature below the actual space temperature and a heating airflow stream having a temperature above the actual space temperature. Systems including a plurality of induction-displacement units are also disclosed. Such systems may include an automation system, a chilled water delivery system, a heating water delivery system, and an air delivery system. Methods of operating the induction-displacement units and the aforementioned systems are also disclosed.

In one aspect, the technology relates to an induction-displacement neutral wall air terminal unit having a housing defining a supply airflow path extending from a ventilation air inlet to a supply air outlet, a return airflow path extending from a return air inlet and the supply airflow path, and a heating airflow path extending between an inlet and an outlet, the heating airflow path being separate from both of the supply and the return airflow paths by at least one interior wall; a plurality of induction-type nozzles located within a portion of the housing defining the supply airflow path; a heating element disposed within a portion of the housing defining the heating airflow path; and a return air coil disposed within a portion of the housing defining the return airflow stream. In another aspect, the technology relates to an air conditioning system having at least one induction-displacement neutral wall air terminal unit such as the type identified above, the induction-displacement neutral wall air terminal unit being located in a space; an air handling system in fluid communication with a ventilation air inlet of the induction-displacement air terminal unit; a cooling plant in fluid communication with the return air coil of the induction-displacement air terminal unit; a heating plant in fluid communication with the heating element of the induction-displacement air terminal unit; and an automation system in communication with the induction-displacement air terminal unit, the air handling system, the cooling plant, and the heating plant. In another aspect, the technology relates to a method of conditioning a space with at least one induction-displacement neutral wall air terminal unit, the method including delivering a supply airflow stream from the induction-displacement neutral wall air terminal unit to the space at a temperature below an actual temperature of the space, wherein the supply airflow stream includes a return airflow stream obtained from the space and a ventilation airflow stream delivered from outside the space; and simultaneously delivering a separate heating airflow stream from the induction-displacement neutral wall air terminal unit to the space at a temperature above the actual temperature of the space.

DETAILED DESCRIPTION

This disclosure relates to an induction-displacement neutral wall air terminal unit and air conditioning systems that utilize induction-displacement neutral wall air terminal units. In general, an induction-displacement neutral wall air terminal unit is located within a space, and delivers to the space a conditioned supply airflow stream that includes a ventilation airflow stream and a return airflow stream induced into the unit by the ventilation airflow stream. In other embodiments, other air handling units (such as standard fan coil units) may be utilized instead of induction-displacement neutral wall air terminal units, although the control sequencing may be different. Additionally, systems that utilize other air handling units may not achieve all of the benefits achieved with induction-displacement neutral wall air terminal units, with regard to high efficiency displacement ventilation, simultaneous heating and displacement ventilation, and quiet operation. Use of induction-displacement neutral wall air terminal units may, in certain embodiments, meet the noise requirements of ANSI Standard S12.60, which may be advantageous in applications where reduced noise is desirable, such as in school classrooms.

Figure 1:
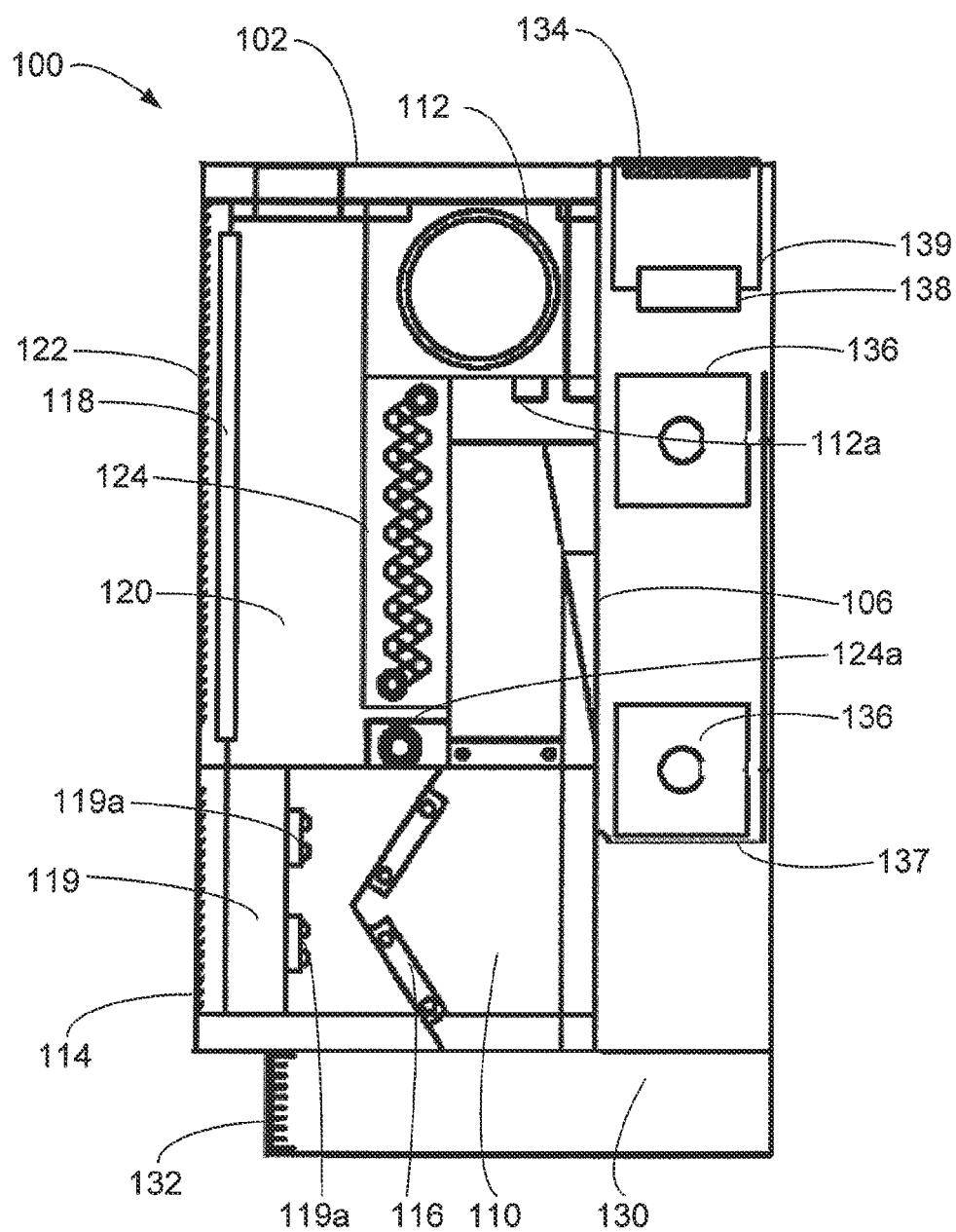
FIG. 1 is a schematic side view of a first embodiment of an induction-displacement air terminal unit.
Figure 2:
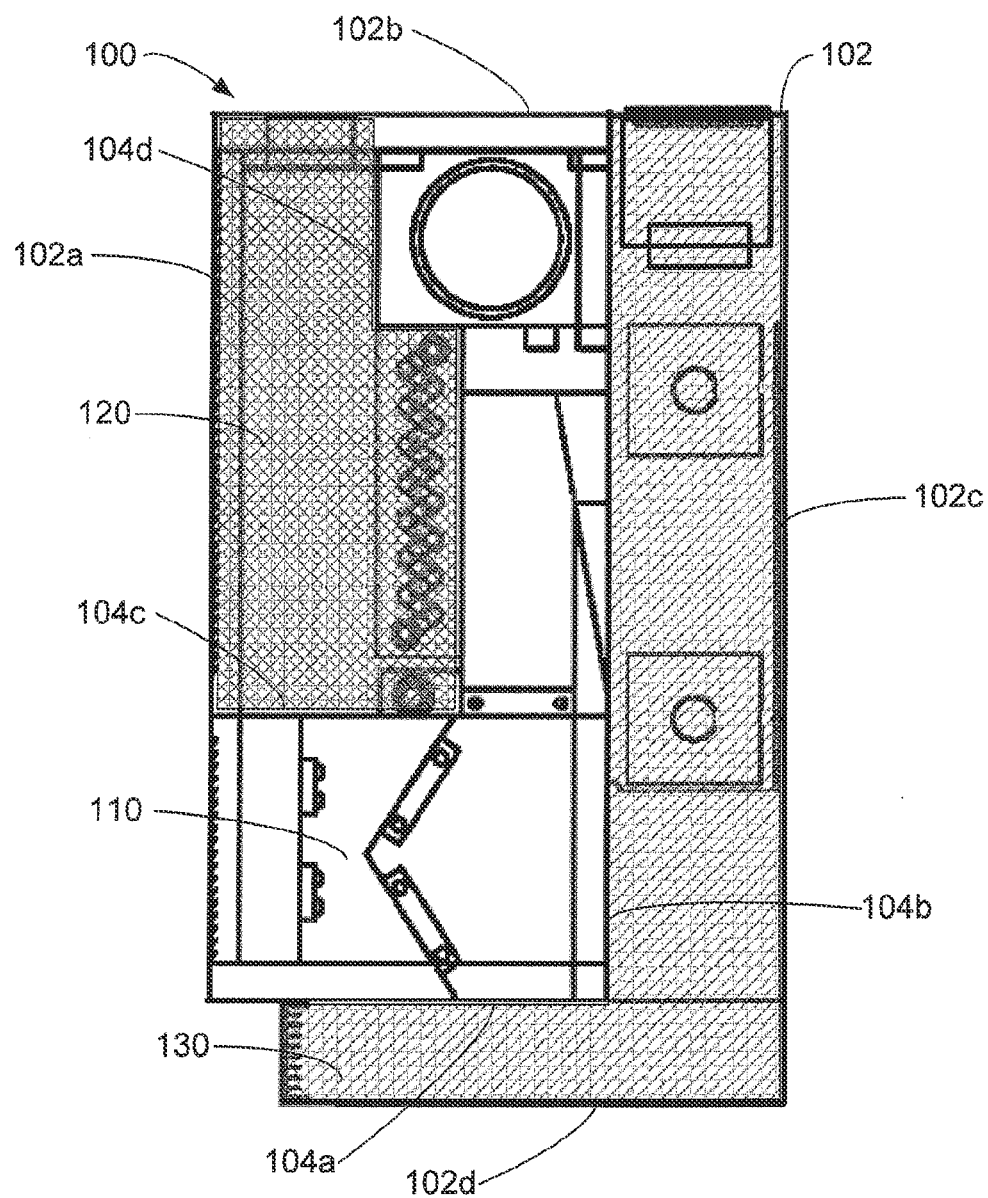
FIG. 2 is a schematic side view of the embodiment of FIG. 1, further showing airflow pathways within the unit.
Figure 3:
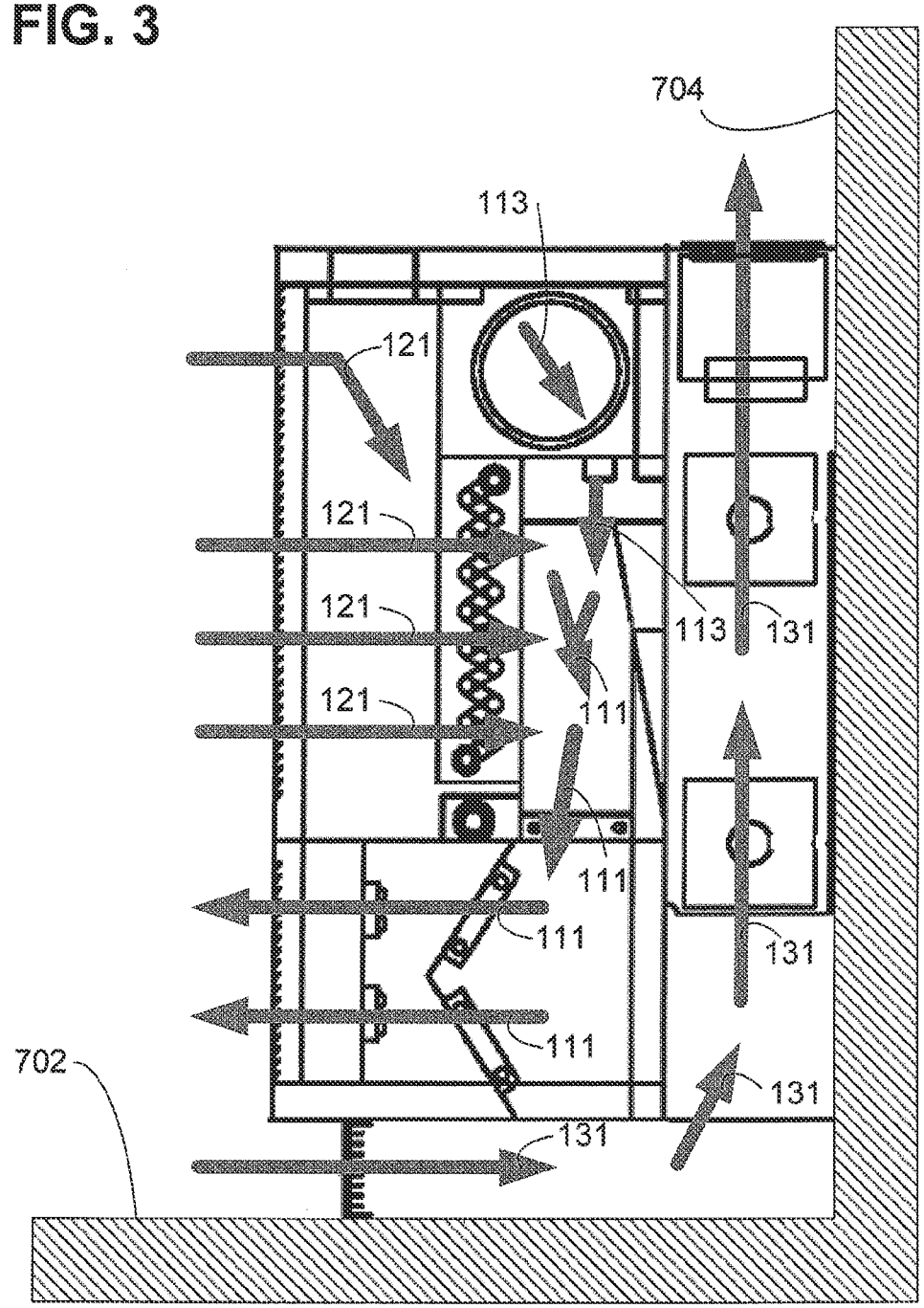
FIG. 3 is a schematic side view of the embodiment of FIG. 1, further showing the direction of airflow streams through the airflow pathways.
Figure 4:
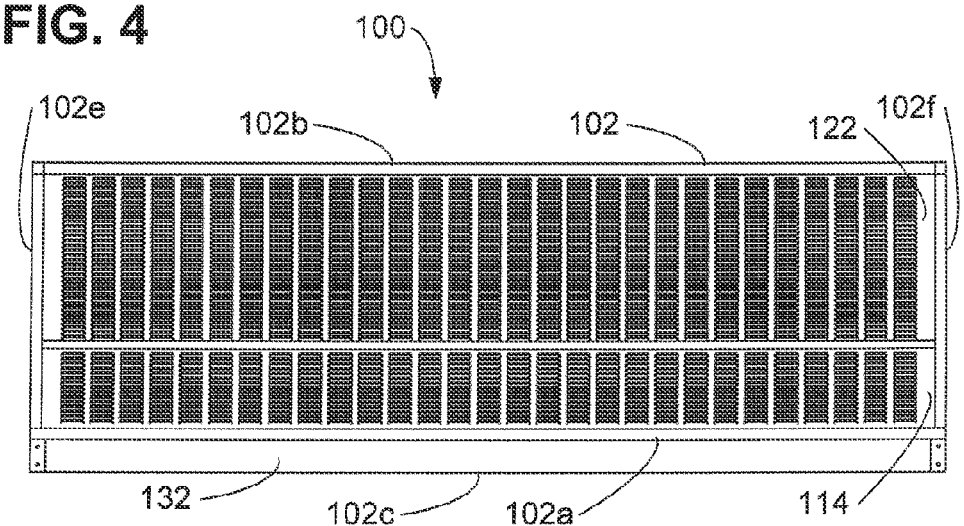
FIG. 4 is a schematic front view of the embodiment of FIG. 1.
Figure 7:
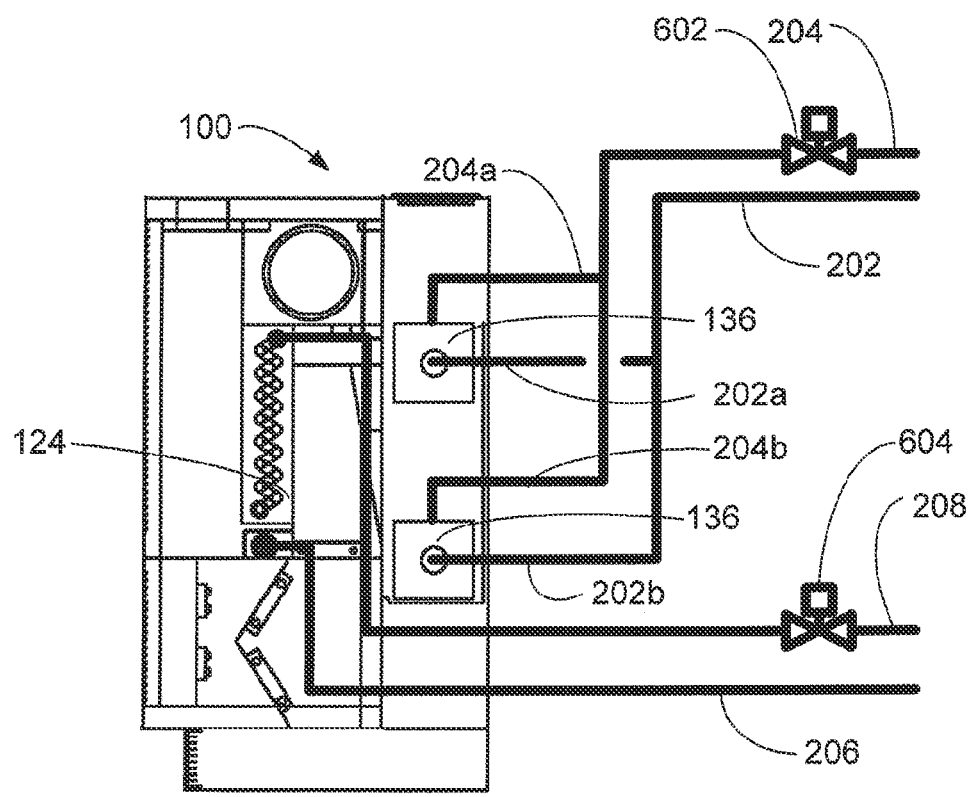
FIG. 7 is a schematic side view of the embodiment of FIG. 1, further showing a schematic piping arrangement.
Figure 8:
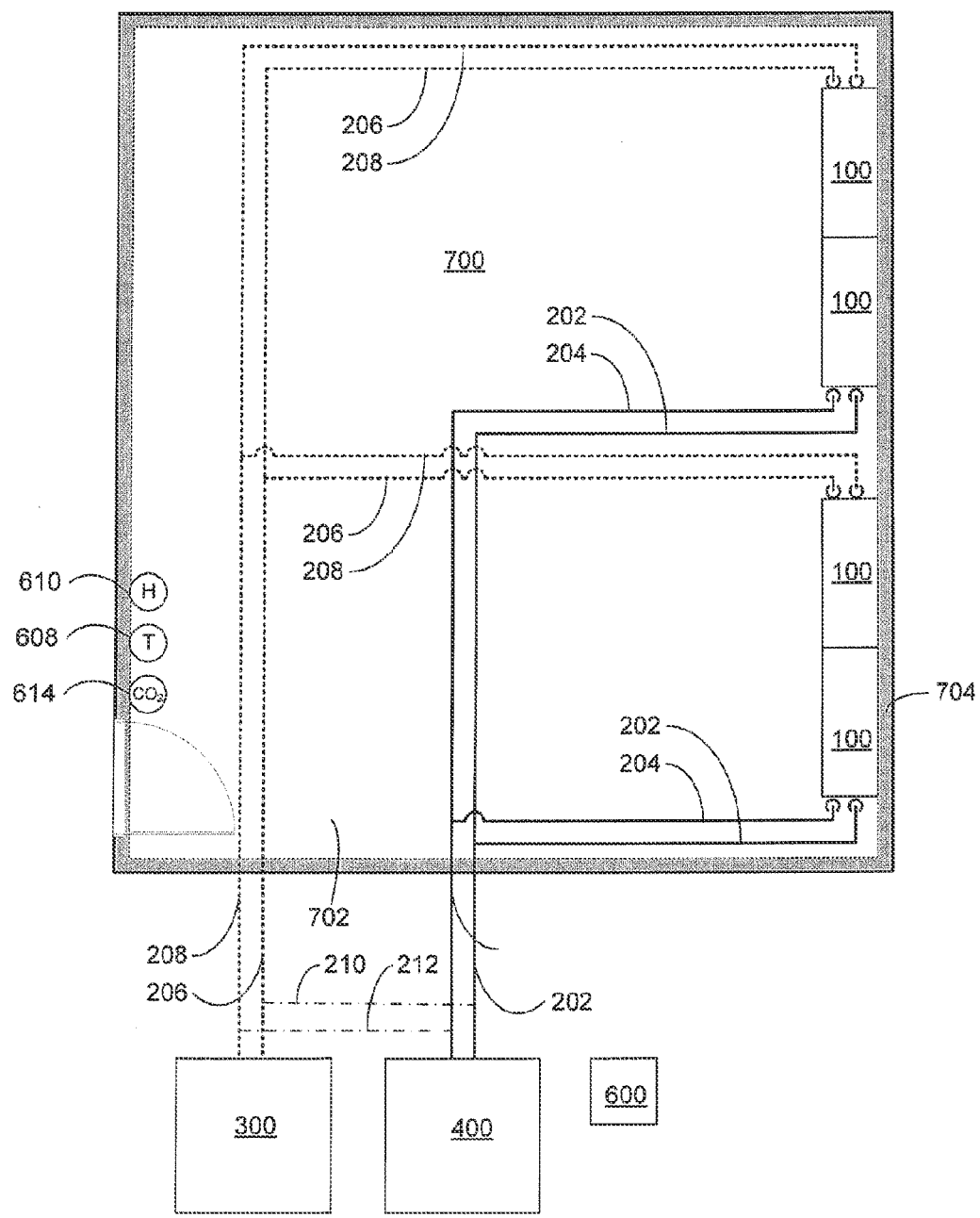
FIG. 8 is a schematic diagram of a first embodiment of a heating and cooling system in conjunction with the embodiment of FIG. 1.
Figure 9:
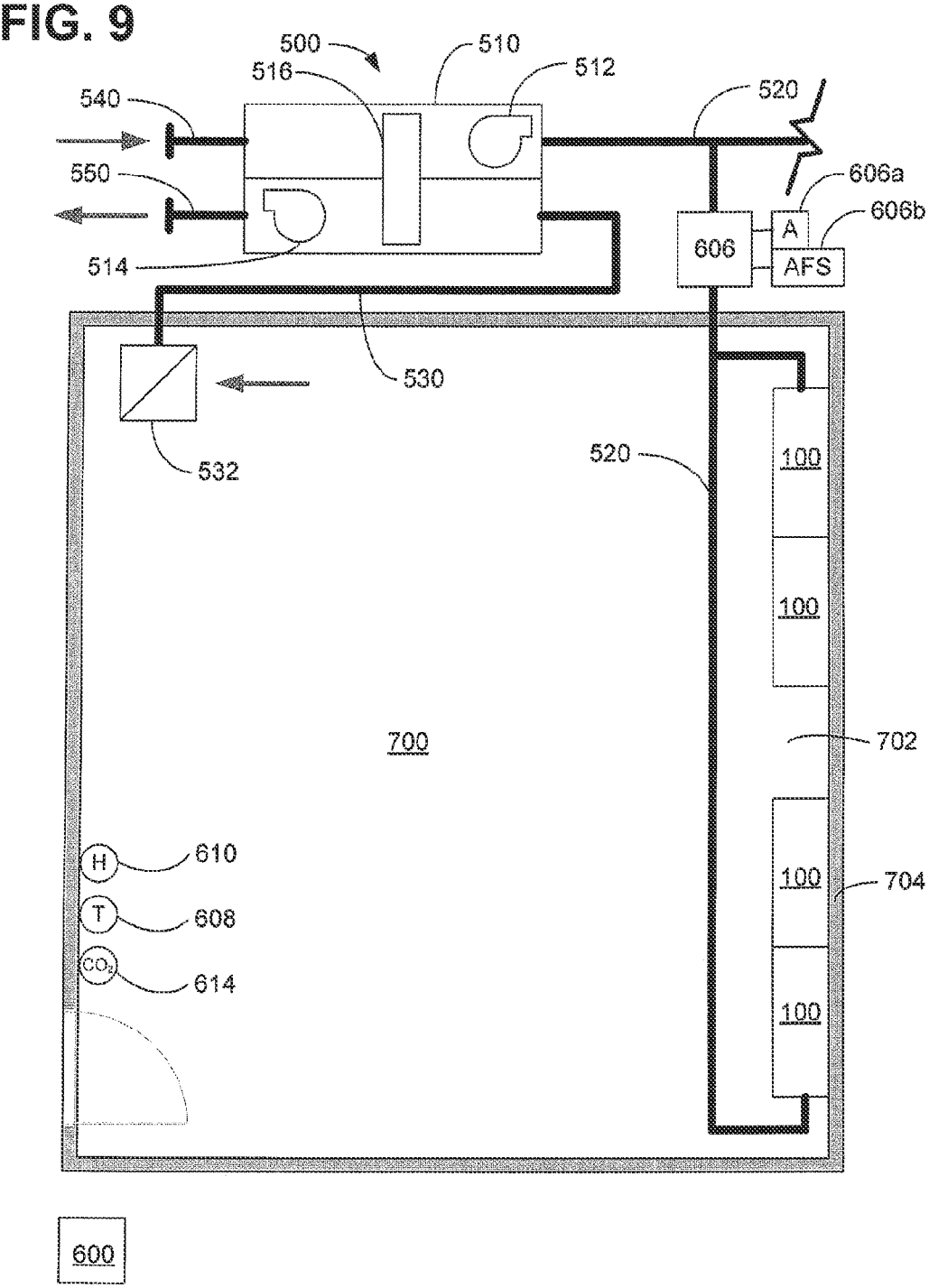
FIG. 9 is a schematic diagram of a first embodiment of an air handling system used in conjunction with the embodiment of FIG. 1.

One example of an induction-displacement neutral wall air terminal unit in accordance with the present disclosure is shown in FIGS. 1-4 and 7-9. As shown, air terminal unit 100 includes a housing 102 having a front side 102a, a top side 102b, a back side 102c, a bottom side 102d, a first side end 102e, and a second side end 102f. In one embodiment, unit 100 has a length across the front side 102a of about 72 inches while in another embodiment the unit has a length of about 90 inches. However, one skilled in the art will readily appreciate that any desired length may be chosen. As can be seen in FIGS. 3 and 8-9, multiple units 100 can be connected together and located in a space 700 such that the back sides 102c are adjacent to a wall 704 of the space 700 and such that the bottom sides 102d are resting on a floor 702 of the space 700. The housing 102 also includes a first interior wall 104a, a second interior wall 104b, a third interior wall 104c, and a fourth interior wall 104d. The sides 102a-d and the interior walls 104a-d are configured to divide the interior of the unit into three definable airflow paths, as described in the following paragraphs.

The Neutral Wall Heating Airflow Path System:

Referring to FIG. 2, housing 102 defines a heating airflow path 130. Heating airflow path 130 is for recirculating air within the space. In that regard, the components described herein are used for heating a heating airflow stream 131 such that the space 700 can be maintained at a desired space temperature set point when in a heating mode of operation. As shown in the drawings, heating airflow path 130 is defined by housing sides 102b-c, d and interior walls 104a-b. Heating airflow path is also defined by inlet 132 and outlet 134 which allow for air from the space 700 to enter and exit the unit 100. Although one inlet 132 is shown, additional or alternative inlets may be provided at the sides or top of the unit.

Disposed within the heating airflow path 130 are heating elements 136, supported by mounting brackets 137. Although two heating elements are shown in the drawings, one skilled in the art will appreciate that a single heating element or more heating elements may be provided in the heating airflow path 130 in order to achieve a desired unit heating capacity. Heating elements 136 may be any type of heating element. Non-limiting examples include fin-tube radiation and heating air coils which may be either hydronic, steam or electric based. Where the heating elements 136 are hydronic, they can be connected to a heating system 400 via supply piping system 202 and return piping system 204, as shown in FIGS. 7-8. Heating system 400 may be a heating plant that includes piping, pumps, valving, and any type of heating source, for example, standard efficiency boilers, high-efficiency boilers (e.g. greater than 90% efficient), and/or geothermal heat-pumps. In the particular embodiment shown in FIG. 7, heating elements 136 are piped in parallel via piping 202a,b and 204a,b and served by a single control valve 602. Where the heating element is a hydronic or steam unit, a control valve 602 in communication with a control system 600 and a temperature sensor 608 can perform the heating temperature control function. One skilled in the art will appreciate that a great variety of piping and valve arrangements are possible.

Also disposed within the heating airflow path 130 is fan assembly 138 and fan assembly housing 139. Although the heating airflow stream 131 may occur via natural convention within the induction-displacement neutral wall air terminal unit, the fan assembly 138 may be utilized to increase the rate of airflow through the return airflow path 130. Increasing the airflow rate has the effect of increasing the overall heating capacity of the unit 100, as space heating occurs primarily by natural convection when the fan assembly 138 is either inactive or not present. As such, fan assembly 138 is especially useful in applications where the heating elements 136 do not have a high heating capacity. This is the case when fin-tube radiation is used in conjunction with a geothermal heat pump system as supply heating water temperatures are generally no more than 140 degrees F. In such applications, fans having a total flow rate of about 300 cfm may be desirable, depending on the heating requirements and heating capacity.

Figure 5:
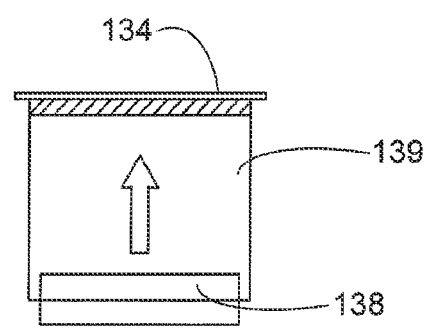
FIG. 5 is a schematic side view of a fan module usable in the embodiment of FIG. 1
Figure 6:
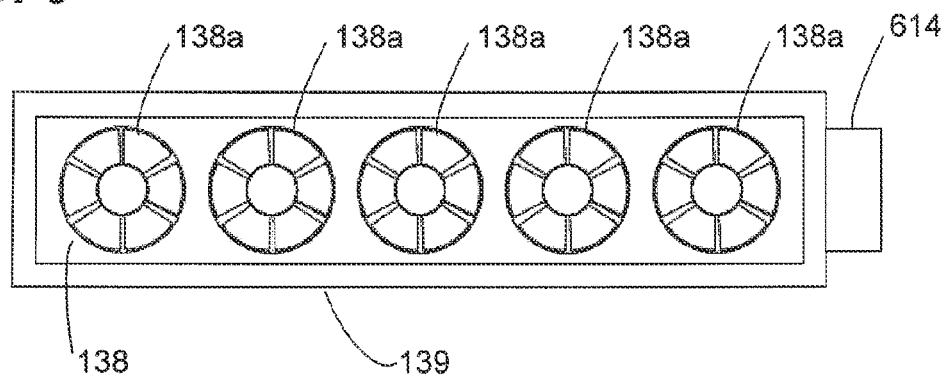
FIG. 6 is a schematic top view of the embodiment of FIG. 5.

Referring to FIGS. 5 and 6, fan assembly 138 is shown as including six fans 138a. However, one skilled in the art will appreciate that any number of fans may be provided without departing from the concepts disclosed herein. Many types of fans are useful for this purpose, such as high efficiency direct drive fans. One non-limiting example of a suitable fan assembly is an in-row server rack cooling fan assembly, typically used in computer data center applications. Exemplary fan assemblies may be provided by Rackmount Solutions, Ltd. of Plano, Tex. Fan assembly housing 139 is for supporting the fan assembly 138 and the heating airflow path outlet 134. In this configuration, the entire assembly can be easily lifted in and out of an opening in the top of the unit 100. This modularity allows for unit 100 to be manufactured in the same manner regardless of whether a fan assembly 138 will be installed in the unit 100. A filter may also be provided upstream of the fan assembly 138 in order to better maintain operability and to help extend the useful service life of the fans. In other embodiments, the filter may be installed at or near the return air inlet 132 to prevent dust or other contaminants from being drawn into the heating elements 136.

The Supply Airflow Path System:

FIG. 2 also shows a supply airflow path 110 within housing 102. Supply airflow path is for delivering a supply airflow stream 111 to the space 700 such that that the space 700 can be selectively ventilated and cooled. As discussed later, supply airflow stream 111 is the combination of a ventilation airflow stream 113 and a return airflow stream 121 from space 700. As shown, supply airflow path 110 is defined by sides 102*a-b* and interior walls 104*a-d*. Supply airflow path 110 is also defined by supply air outlet 114 and ventilation air inlet 112. Ventilation air inlet 112 is for receiving treated ventilation air from an air handling system 500, discussed later. Supply air outlet 114 is for allowing the supply airflow stream to be delivered to the space 700. Supply airflow path 110 is further defined by a return air coil 124 disposed within the return airflow path 120, discussed later.

Disposed within supply airflow path 110 are a plurality of induction nozzles 112*a*. Induction nozzles 112*a* are for increasing the velocity of the ventilation airflow stream 113 to such an extent that the return airflow stream 121 is induced into the supply airflow path 110. As can be most easily seen at FIGS. 1 and 3, return airflow stream 121 is in fluid communication with the supply airflow path 110 by virtue of return air coil 124 which is open to both the supply airflow path 110 and the return airflow path 120.

Also disposed within supply airflow path is filter assembly 118. Filter assembly 118 includes a number of individual filters. As shown in FIG. 1, filter assembly 118 is configured in a flat orientation. Filter assembly 118 is for filtering the return airflow stream 121 such that filtered air is delivered to the space 700. Because the return airflow stream 121 is air from the occupied space 700, it may contain an unacceptably high level of contaminants. As such, it is desirable to filter at least the return airflow stream 121 prior to reintroducing the air back into the space 700. Furthermore, filter assembly 118 may include any type of filter 118*a* suitable for filtering air, for example, a pleated panel filter and/or a high efficiency rated filter. The filter assembly 118 extends generally along the length of the front side 102*a* of the unit 100. As such, multiple filters may be installed end to end such that coverage across the length is obtained. Also, the filters may be removed and replaced by removing on the front side 122.

Supply airflow path 110 is also shown as including nozzle assembly 119 which generally extends the length of the front side 102*a* of the unit 100. Nozzle assembly 119 includes an array of individual nozzles 119*a*. Displacement air nozzles 119*a* are for equalizing the pressure drop of the supply airflow stream 111 such that the airflow pattern leaving the nozzle assembly 119 has a controlled and uniform velocity profile. A baffle distribution plate 116 can also be provided to aid in evening the airflow profile. The supply airflow stream 111 is generally provided to the space 700 at a temperature below the actual temperature in the space 700 so that the air can pool along the bottom portion of the space 700. However, excessive velocities of cool air injected into the space 700 can cause a sense of draftiness on the part of the occupants. As a general rule of thumb of those having skill in the art, a velocity of at or below 50 feet per second will prevent this sensation. To this end, the array of nozzles 119*a* act to maintain airflow velocities at an acceptable level while also ensuring the maximum amount of air can be delivered by distributing the airflow stream as evenly as possible.

Downstream of nozzle assembly 119 is outlet 114. Outlet 114 is for providing an aesthetic appearance on the front side 102*a* of the unit 100 and for further equalizing the airflow velocity pattern of the supply airflow stream 111. Many types of outlets 114 are suitable for this purpose. For example, the outlet 114 can have multiple slot openings or louvered openings. Alternatively, outlet 114 can be a perforated plate. The outlet 114 shown in FIG. 4 has louvered openings. One skilled in the art will appreciate that a combination of a perforated plate behind an outlet having slot or louvered openings could also be used.

The ventilation air inlet 112 can be connected to another unit 100 or to supply ductwork 520 extending from an air handling unit 510 of an air handling system 500, as shown in FIG. 9. In order to control the amount of ventilation air delivered to the inlet 112, an air volume control unit 606 can be installed within the ductwork 520 or located at the inlet 112. If installed in the ductwork, the volume control unit 606 can be a damper with a damper actuator, or as shown in FIG. 9, can be a variable air volume box 606 having an air flow measuring device 606*b* and a damper with a damper actuator 606*b*. One skilled in the art will appreciate that a great variety of ducting and volume control arrangements are possible. As shown in FIG. 9, the air handling unit 510 can be configured to have a ventilation air inlet 540, a desiccant heat wheel 516, heating and cooling coils (not shown), and a supply fan 512 arranged to deliver treated ventilation air to any number of units 100. The air handling unit 510 can also be configured to remove air from the space 700 via a return grille 532, ductwork 530, relief fan 514, and outlet 550. In operation, the desiccant wheel 516 transfers heat and moisture from the return air to the ventilation air during cool periods (e.g. winter) and vice-versa during warmer periods (e.g. summer). Air handling unit 510, and its related components, can be placed in communication with automation system 600 for centralized control.

The Return Airflow Path System:

As shown in FIG. 2, housing 102 also defines a return airflow path 120. Return airflow path 120 is primarily for increasing the total cooling capacity of the air terminal unit 100 and for filtering the air in the space 700. As shown in the drawings, the return airflow path 120 is defined by front side 102*a* and top side 102*b* of unit 100. Return airflow path 120 is additionally defined by air inlet 102*a* and the supply airflow path 110.

Disposed within return airflow path 120 is return air coil 124. Return air coil 124 is for cooling return airflow stream 121 before the return airflow stream 121 enters the supply airflow path 110. Below return air coil 124 is condensate pan 124*a* which is for capturing moisture removed from the return airflow stream 121 where latent cooling occurs. In the arrangement shown, as best seen at FIG. 3, return airflow stream 121 is induced through return air coil 124 and into supply airflow path 110. Once the return airflow stream 121 enters the supply airflow path 110, the ventilation airflow stream 113 and the return airflow stream 121 mix to form supply airflow stream 111. Where return air coil 124 is a hydronic coil, the coil 124 can be connected to a cooling system 300 via supply piping system 206 and return piping system 208, as shown in FIGS. 7-8. Cooling system 300 may be a central chilled water plant that includes piping, pumps, valving, and any type of chilled water source, for example, reciprocating chillers, centrifugal chillers, screw-driven chillers, scroll chillers, and/or geothermal heat pumps. In the particular embodiment shown in FIG. 7, return air coil 124 is served by a single control valve 604. Alternatively, cooling system 300 can be configured to selectively provide either heating water or chilled water, as is the case with a geothermal heat pump system. In such an arrangement, it is possible to eliminate system 400 and provide all necessary heating and cooling with system 300. One skilled in the art will appreciate that a great variety of plant, piping, and valve arrangements are possible.

Operation of the Induction-Displacement Air Terminal Unit:

In operation, induction-displacement neutral wall air terminal unit 100 can simultaneously provide low temperature displacement air to the space 700 while also providing heat to the space 700. This operation is a significant improvement over prior art systems that are capable of only providing heat to a space by heating the supply airflow stream above the actual temperature of the space. The various modes of operation of the unit 100 that allow for simultaneous heating and displacement air delivery are described in this section.

Induction-displacement air terminal unit 100 can be configured to operate in several modes of operation in conjunction with an automation system 600. In order to implement the modes of operation, automation system 600 can be placed in communication with valves 602, 604, and the variable air volume box 606 associated with each unit 100. Automation system 600 can also be placed in communication with heating system 400, cooling system 300, and air handling system 500. Furthermore, automation system 600 can be placed in communication with a number of sensors within each space. For example, a humidity sensor 610, a temperature sensor 608, and a carbon dioxide sensor 614. The modes of operation of the automation system 600 allow a space to be heated, cooled, and ventilated simultaneously, as required. In general, and as described below, a supply airflow stream delivered during a cooling and ventilating operation will generally be below the actual temperature of the space being conditioned. This allows the induction-displacement ventilation described herein to operate as intended. Additionally, a heating airflow stream delivered during a heating operation will generally be above the actual temperature of the space being conditioned. As the space conditioning unit is typically located proximate a building envelope, heating losses through the envelope are overcome even as cool ventilation air is delivered to the space to maintain outside air requirements and displacement criteria.

One possible mode of operation for unit 100 and automation system 600 is a "heating occupied mode." This mode of operation would be desirable in instances where it is known that space 700 will require both heating and ventilation at the same time. In this mode, the heating system 400 is activated and the output of heating elements 136 and fan assembly 138 can be cycled or modulated to maintain a space temperature set point for space 700. Where heating elements 136 are hydronic, control valve 602 can be controlled in this manner. The fan assembly can be cycled simultaneously with valve 602 operation, or can be activated after valve 602 has opened fully and further heating output is necessary to satisfy the space temperature set point. Also, in this mode of operation air handling unit 510 can be activated such that ventilation air at the desired temperature can be delivered to the units 100. Ventilation air can be controlled by allowing the variable air volume damper 606a to modulate between a minimum air flow rate and a maximum air flow rate to meet a space carbon dioxide set point. The minimum and maximum air flow rates can be entered into system 600 while the actual air flow rate can be measured at air flow sensor 606b. In this mode of operation, displacement ventilation air is provided to the space while heating is also provided by the unit 100.

Another possible mode of operation is a "heating unoccupied mode." This mode of operation would be desirable where it is anticipated that heating will be needed in space 700, but at a time when the space is unoccupied, such as in the evening for a school or office space. This mode of operation is similar to that for the heating occupied mode for control of the heating airflow stream 131. However, the air handling system 500 is generally deactivated and the ventilation airflow stream is not delivered. In this case, the heating elements 136 of unit 100, and fan assembly 138, if provided, can provide all needed heating for the space 700. It is also possible to control unit 100 such that heating is also provided with return air coil 124. In this circumstance, air would flow backwards through the unit from outlet 114 to inlet 122 via convection caused by heating the air with the coil 124. However, unlike prior art induction-displacement units, it is not necessary to implement a control sequence to cycle the air handling unit 510 on because heating elements 136 and fan assembly 138 can be designed to meet the full heating load of space 700.

Yet another possible mode of operation is a "cooling occupied mode." This mode of operation would be desirable where it is anticipated that both cooling and ventilation will be needed in space 700. This mode of operation is similar to the heating occupied mode in terms of ventilation control. However, the cooling system 300 is activated instead of the heating plant 400. To provide cooling to the space, valve 604 can be configured to modulate to maintain a space temperature set point. An additional sensor may be provided downstream of the return air coil 124 to ensure that condensation does not occur, if desired. Such a consideration would be necessary where no drain pan 124a is provided below the coil 124. Alternatively, a supply chilled water temperature from system 300 can be set such that condensation is not possible, and so that only sensible cooling occurs at the coil 124.

One skilled in the art will appreciate that many modes of operation and control sequences are possible without departing from the concepts presented herein.

Example Performance Data:

For the purpose of providing an example configuration of unit 100, and anticipated performance, table 1 is provided below.

TABLE 1

| | |
|---|---|
| Nominal Unit Length | 72 inches |
| Ventilation airflow rate | 110 cfm |
| Return airflow rate (air induced into unit by ventilation airflow stream) | 220 cfm |
| Supply airflow rate | 330 cfm |
| Return air coil cooling capacity | 1,700 btuh (sensible cooling to 61° F.) |
| Ventilation airflow stream cooling capacity | 3,025 btuh (at 53° F. supply temperature) |

TABLE 1-continued

| | |
|---|---|
| Heating capacity through heating airflow path (average water temperature 170° F. without fan) | 9,300 btuh |
| Heating capacity through heating airflow path (average water temperature 110 with fan) | 10,000 btuh |
| Noise Levels | 26.5 (exceeds ANSI/ASA Standard S12.60 of NC 27) |

As can be appreciated, Table 1 shows that unit 100 is capable of providing simultaneous heating through the heating airflow path and displacement air to the space at a temperature independent of the heating airflow path.

While there have been described herein what are to be considered embodiments of the present technology, other modifications will become apparent to those skilled in the art from the teachings herein. The particular configurations and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An induction-displacement neutral wall air terminal unit comprising:
    a housing defining:
        a supply airflow path extending from a ventilation air inlet to a supply air outlet;
        a return airflow path extending from a return air inlet and the supply airflow path; and
        a heating airflow path defined within the housing and extending between an inlet and an outlet, the heating airflow path being permanently separated from both of the supply and the return airflow paths by at least one interior wall;
    a plurality of induction-type nozzles in direct fluid communication with the ventilation air inlet and being located upstream of the supply air outlet and being within a portion of the housing defining the supply airflow path such that an airflow from the ventilation air inlet flows through the plurality of induction-type nozzles and into the supply airflow path;
    a plurality of displacement-type nozzles located between the supply air outlet and the plurality of induction-type nozzles and being within a portion of the housing defining the supply airflow path; an air movement device for moving air across the heating element and through the heating airflow path;
    a heating element disposed within a portion of the housing defining the heating airflow path;
    and
    a return air coil disposed within a portion of the housing defining the return airflow stream;
    wherein the induction-displacement neutral wall air terminal unit has a first, second, and third operational mode:
        the first operational mode being a displacement ventilation cooling only mode wherein air from the ventilation air inlet induces air through the return airflow path and into the supply airflow path, through the plurality of displacement-type nozzles, and out of the supply air outlet, and wherein the heating element and air movement device for moving air across the heating element are deactivated;
        the second operational mode being a heating only mode wherein the heating element and air movement device for moving air across the heating element are activated to generate a heated airflow from the heating air inlet to the heating air outlet without air flowing from the ventilation air inlet into the supply airflow path;
        the second mode being a simultaneous heating and displacement ventilation cooling mode wherein air from the ventilation air inlet induces air through the return airflow path and into the supply airflow path, through the plurality of displacement-type nozzles and out of the supply air outlet and wherein the heating element and air movement device for moving air across the heating element are activated to generate a heated airflow from the heating air inlet to the heating air outlet.

2. The induction-displacement neutral wall air terminal unit of claim 1, wherein the air movement device for moving air comprises a plurality of fans located within the portion of the housing defining the heating airflow path.

3. The induction-displacement neutral wall air terminal unit of claim 1, wherein the housing further defines:
    a heating airflow path inlet located on at least one of a front face and a side of the housing; and
    a heating airflow path outlet located on a top face of the housing.

4. The induction-displacement neutral wall air terminal unit of claim 1, wherein the heating element comprises at least one of fin-tube radiation, a heating coil, a hydronic heating element, a steam heating element, and an electric heating element.

5. The induction-displacement neutral wall air terminal unit of claim 1, wherein the heating element comprises at least two heating elements.

6. The induction-displacement neutral wall air terminal unit of claim 1, wherein at least one of the return air coil and the heating element is connected to a geothermal heat pump system.

7. The induction-displacement neutral wall air terminal unit of claim 1, wherein the unit provides at least about 8,000 btuh of heating through the heating airflow path when the heating element is served by water having a temperature of between 120° F. and 180° F.

8. The induction-displacement neutral wall air terminal unit of claim 1, wherein
    the unit provides a supply airflow stream having a temperature of 53° F. in the first and third operational modes.

9. An induction-displacement neutral wall air terminal unit for conditioning a space having a floor and a wall, the unit comprising:
    (a) a housing defining:
        i. a top face, a front face, a back side configured to allow the housing to be mounted against the wall, and a bottom side configured to allow the housing to be mounted against the floor;
        ii. a supply airflow path extending between a ventilation air inlet and a supply air outlet, the supply air outlet located on the front face of the housing to provide a displacement ventilation airflow to the space proximate the floor;
        iii. a return airflow path extending from a return air inlet located in the front face of the housing to the supply airflow path;
        iv. a heating airflow path defined within the housing and permanently separated from the supply and return airflow paths by at least one internal housing wall, the heating airflow path extending between a heating air inlet located in the front face of the housing and a heating air outlet located at the top face of the housing to provide a heating airflow to the space from the top face of the housing, wherein the heating air inlet is separate from the return air inlet and the heating air outlet is separate from the supply air outlet;

(b) a plurality of induction-type nozzles located upstream of the supply air outlet and being within a portion of the housing defining the supply airflow path;

(c) a plurality of displacement-type nozzles located between the supply air outlet and the plurality of induction-type nozzles and being within a portion of the housing defining the supply airflow path;

(d) a heating element disposed within a portion of the housing defining the heating airflow path;

(e) an air movement device located within the heating airflow path configured to move air across the heating element within the heating airflow path; and (f) a return air coil disposed within a portion of the housing defining the return airflow stream, the return air coil being separate from the heating element.

10. The induction-displacement neutral wall air terminal unit of claim 9, wherein the air movement device includes a plurality of fans.

11. The induction-displacement neutral wall air terminal unit of claim 9, wherein the heating element is capable of providing 10,000 BTUH of heat with an average water temperature of 110° F.

12. The induction-displacement neutral wall air terminal unit of claim 11, wherein the air movement device is capable of moving 300 cfm of air across the heating element.

13. The induction-displacement neutral wall air terminal unit of claim 9, wherein at least one of the induction nozzles is adjacent to a top portion of the return air coil.

14. The induction-displacement neutral wall air terminal unit of claim 9, wherein the air movement device is located between the heating element and the heating air outlet.

* * * * *